Inventor:
John L. Slonneger,
by John M. Stoudt
Attorney

Inventor
John L. Slonneger,
by John L. Stoudt
Attorney

Inventor
John L. Slonneger,
by John L. Stoudt
Attorney

Inventor
John L. Slonneger,
by John M. Stoudt
Attorney.

Dec. 20, 1966 J. L. SLONNEGER 3,293,388

PLUNGER OPERATED SWITCH UNIT FOR USE IN A DYNAMOELECTRIC MACHINE

Filed Feb. 24, 1965 5 Sheets-Sheet 5

Inventor:
John L. Slonneger,
by John M. Stoudt
Attorney

United States Patent Office 3,293,388

Patented Dec. 20, 1966

3,293,388

PLUNGER OPERATED SWITCH UNIT FOR USE IN A DYNAMOELECTRIC MACHINE

John L. Slonneger, Morrison, Ill., assignor to General Electric Company, a corporation of New York Filed Feb. 24, 1965, Ser. No. 435,013
12 Claims. (Cl. 200—67)

The present application is a continuation-in-part of my copending application Serial No. 281,938, filed May 21, 1963, now abandoned.

This invention relates to an improved switch assembly and more particularly to an improved plunger actuated switch unit especially suitable for use with a speed responsive device to control a plurality of circuits including an auxiliary or start winding circuit of a split phase induction type dynamoelectric machine.

For those dynamoelectric machine applications where high starting torque per ampere is extremely important for a given size machine, such as domestic motor application, including typewriters, refrigerators, automatic dryers, and other appliances, it has been customary to construct the motor with at least one main excitation or running winding and a start winding. A single phase split phase induction motor is an example in which the windings are carried by the motor stator physically displaced one from the other. This structure produces a space phase in the respective winding currents, which are also conventionally displaced in time phase by use of such circuitry as resistors, capacitors, and the like. Conventionally, the starting winding is disconnected from a power source once the motor reaches a predetermined operating speed. One common way of effecting deenergization of the start winding in response to a predetermined motor speed as by a centrifugally actuated mechanism, responsive to the motor speed, which in turn opens the switch of a winding control switch unit in the circuit of the start winding when the motor attains the desired operating or running speed.

In many appliance applications requiring the above type electric motor, it is extremely desirable, if not essential, that the switch unit be capable of at least one hundred thousand cycles of trouble-free operation in order to be commensurate with the life expectancy of the other motor components and the equipment in which the motor is utilized. Moreover, it is desirable that the switch unit not only can be effectively and efficiently employed with a variety of centrifugal mechanisms in use today, but in addition, can operate a plurality of circuits. Further, the unit should be of rugged or sturdy construction, easily assembled, operate at a relatively low noise level, and at the same time, be inexpensive to produce.

It is a primary object of this invention to provide a novel and improved switch assembly which is very efficiently operable and economical in cost, and it is another object to provide such assembly especially suitable for use with a speed responsive device to control the winding circuit for dynamoelectric machines.

It is another object of my invention to provide an improved switch unit having a single readily operable actuator for controlling a pair of switching devices, one of said switching devices being arranged to provide relatively slow making and breaking action of the contacts thereof, and the other of said switching devices being arranged to provide a snap-acting making and breaking action of the contacts thereof.

It is still another object of my invention to provide a switching unit including a plurality of switching devices, a snap-acting element for rapidly operating the contacts of one of the devices, and a plunger operable by the snap acting element and arranged to actuate each of the switching devices by means of the exertion of a relatively small actuating force upon the plunger.

It is a further object of the present invention to provide an improved switching unit, capable of effective and efficient use with speed responsive mechanisms, which has the desirable features mentioned above.

In carrying out my invention in one form, I provide a switch unit including a housing mounting a pair of switch devices within suitable switch accommodating means, such as a cavity formed by the internal walls of the housing, in which at least one of the devices is suitable for use in the control of a single-phase, split-phase electric motor. Each of the switching devices incorporates a movable contact arm secured at one end, with the free end operable into and out of engagement with one or more associated contacts. A reciprocating plunger or actuator, having a first portion mounted for sliding movement in the cavity and a second portion exposed from the housing, is guided and controlled by the interior housing walls of the unit for transfer between extended and depressed positions as it operates the movable contact arms conjointly of the respective devices. The first switch device has a toggle spring connected to operate its associated movable contact arm in a snap-acting fashion and concurrently to apply a changing force bias on an outer surface of the plunger in a direction toward its extended position. The second switch device is of the slow make and break type, having its movable arm extending through a suitable channel in the plunger and engaging at least one of the channel walls for the greater part of the plunger travel. The movable arm of the second switch device applies a force opposing the movement of the plunger into its extended position such that a cushioning effect is achieved.

In one form, the flexible arm is normally closed when the plunger approaches its extended position and after the contacts have been closed, the plunger is permitted to continue its travel such that the flexible arm tends to resist such movement. In another form, the second switch device has one end mounted to the same electrical conductive support that carries one end of the snap-acting arm of the first switch device and is normally closed when the plunger is in its depressed position. The arm of the second switch is capable of resisting movement of the plunger as it approaches either of the positions. The force exerted on the plunger during switch actuation is predominantly that of the first switch device in both forms of the invention and is sufficient to urge the plunger into its extended position. The forces are readily overcome for transferring the plunger toward the depressed position.

The foregoing is achieved by a construction which is structurally rugged, yet inexpensive to produce, is capable of an operating life well over 100,000 cycles of trouble-free and relatively quiet operation, and effectively lends itself to a wide variety of circuit controlling applications, especially where it is desirable to control more than one circuit, such as in motor applications.

The subject matter which I regard as my invention is particularly pointed out and distinctly claimed in the concluding portion of this specification. My invention, however, both as to organization and method of operation, together with further objects and advantages thereof, may be best understood by reference to the following description taken in conjunction with the accompanying drawings in which:

FIGURE 1 is a side elevational view of an electric motor incorporating a switch unit embodying a first form of the present invention, with a portion of the end frame, rotor and stator members being broken away to show the relative positions of the speed responsive centrifugal switching mechanism and switch actuator components of the machine for operating the switch unit during standstill and starting conditions;

Figures 5, 6, 8:
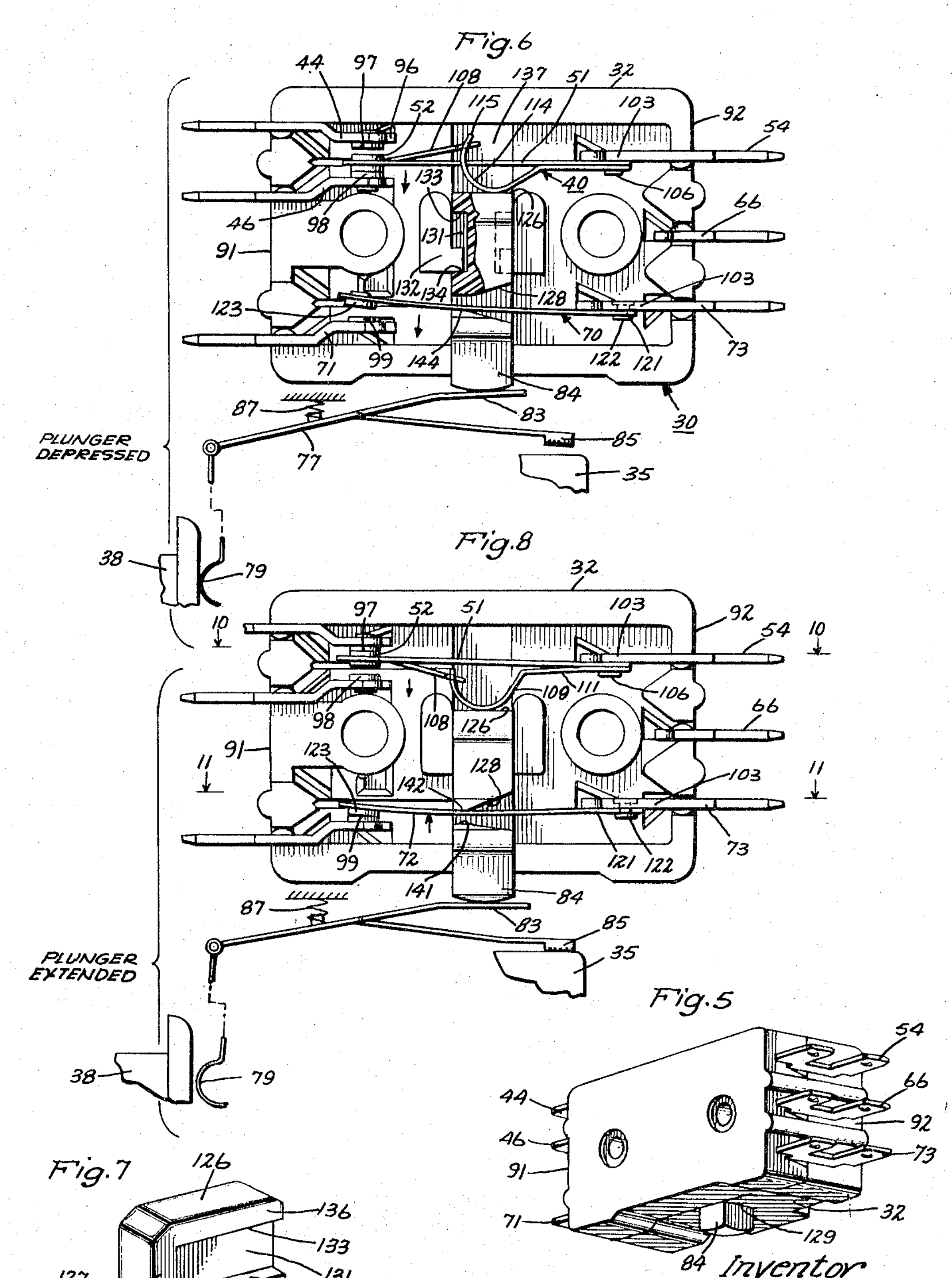
FIGURE 5 is an enlarged view in perspective of the switch unit of FIGURE 4, with the front and plunger parts being shown.
Figure 7:
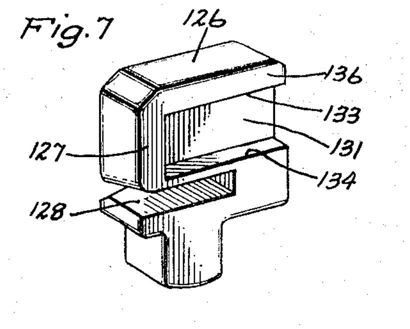
Figure 10:
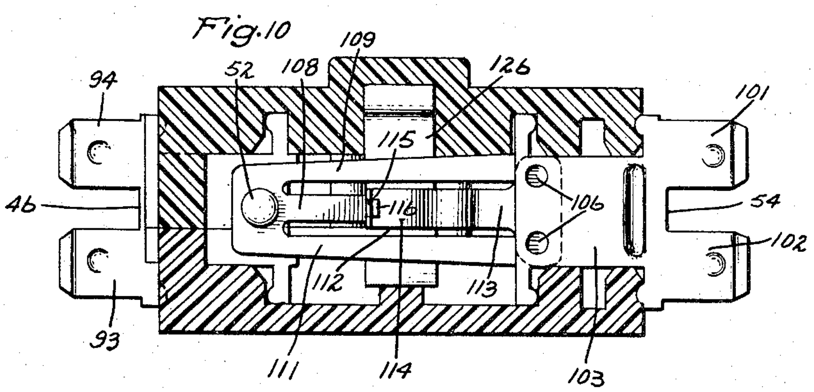
Figure 11:
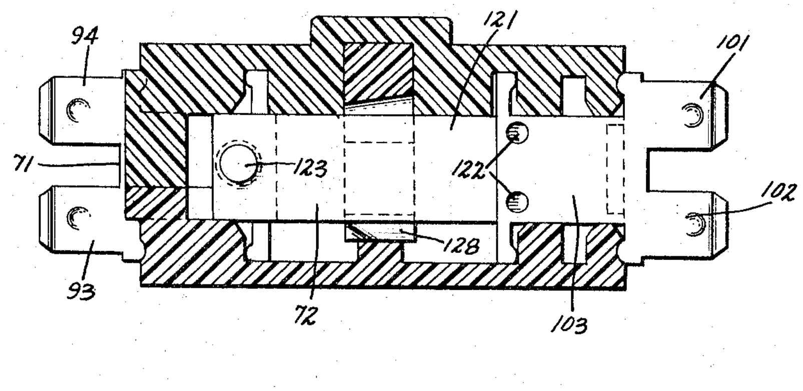
Figure 9:
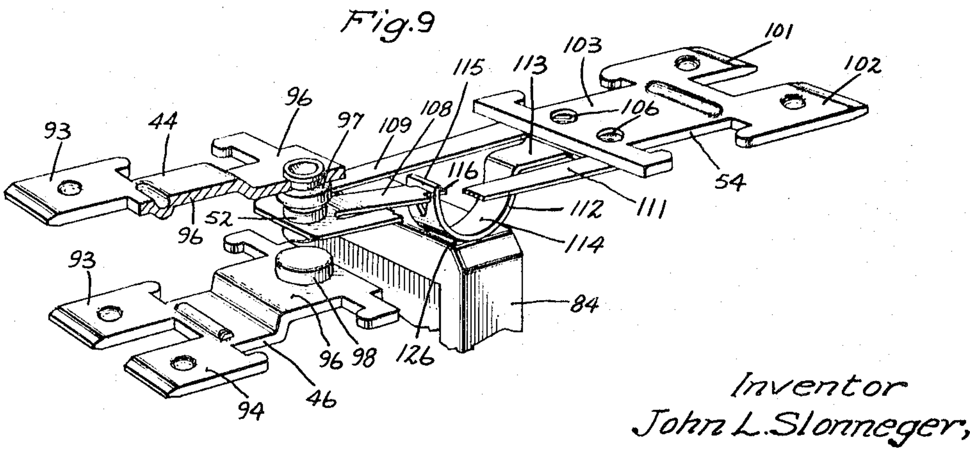
Figures 12, 13, 17:
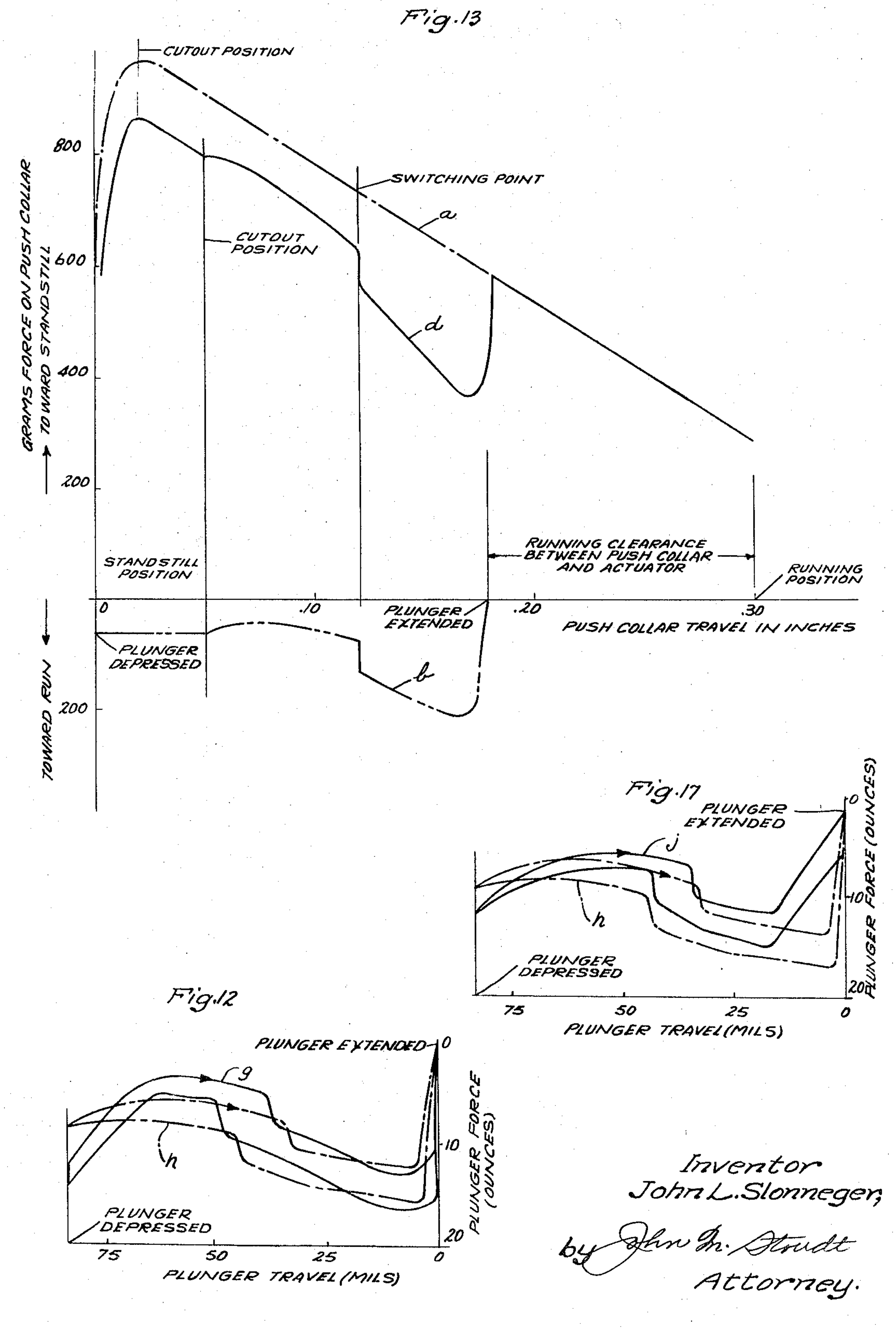
Figure 14:
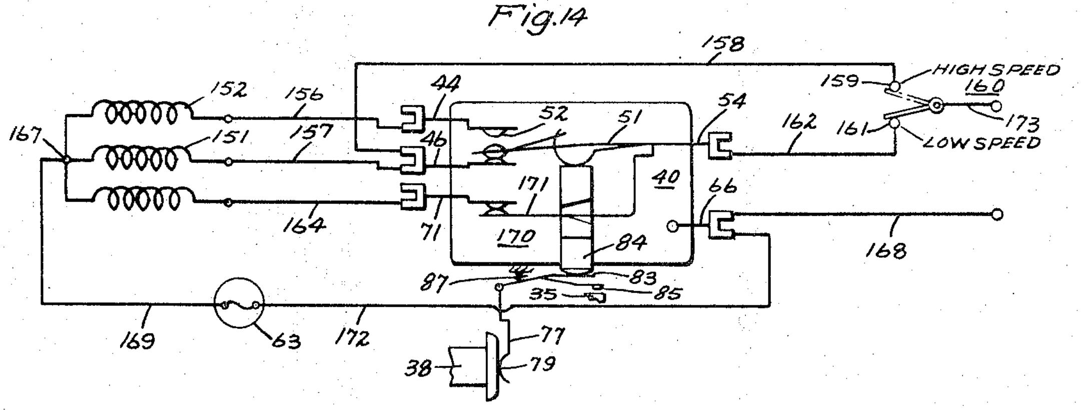
Figures 15, 16:
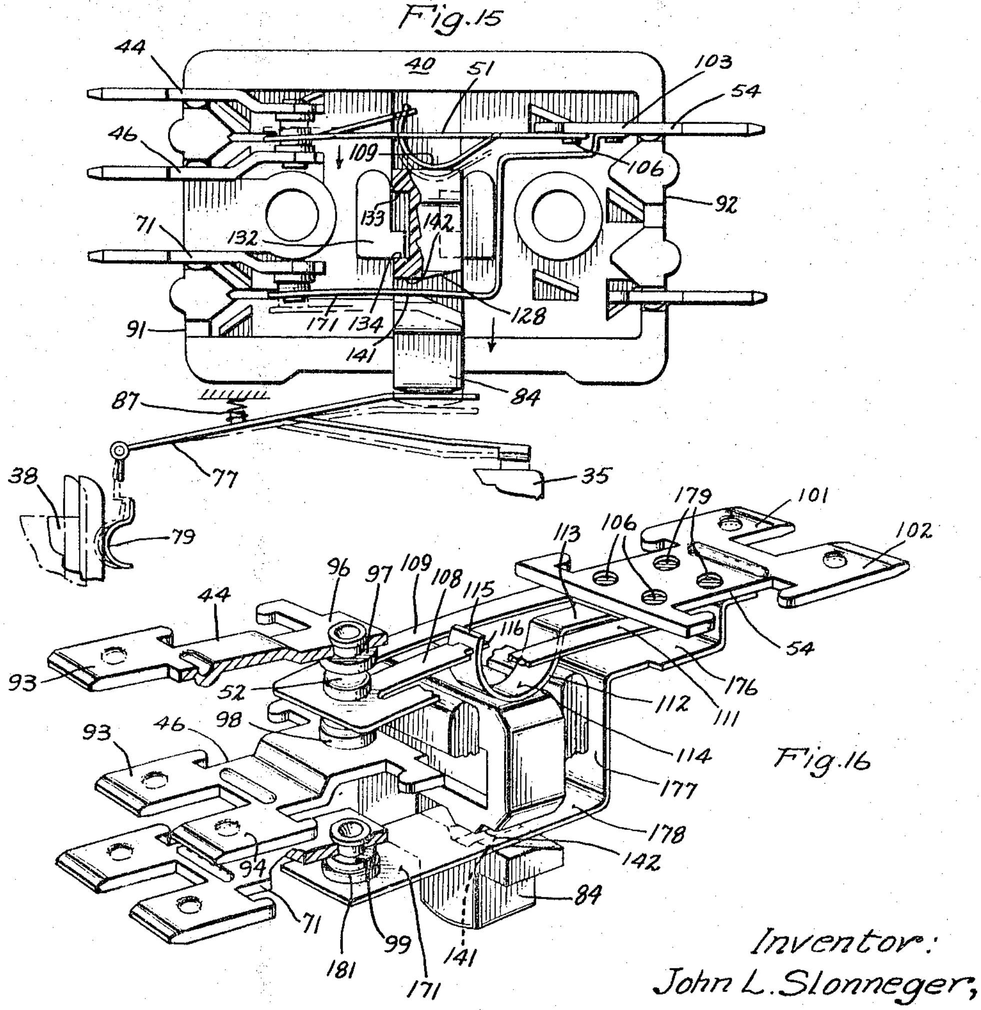

FIGURE 6 is a front enlarged elevational view of the switch unit of the first embodiment, schematically showing the manner in which it cooperates with the push-collar unit and switch actuator of the motor of the exemplification, with one of the housing members removed to show the relative positions of the plunger and switch components of the unit during standstill or starting, and with the push collar and switch actuator being depicted at a 90° angle from their actual locations relative to the switch unit for simplicity of illustration;

FIGURE 7 is a view in perspective of the switch plunger seen in FIGURE 6;

FIGURE 8 is a view similar to that of FIGURE 6, but showing all components in their relative positions under running conditions of the motor;

FIGURE 9 is an enlarged fragmentary view in perspective of the snap-acting switch components of my improved switch unit and adjacent plunger portion in the relative positions shown in FIGURE 8;

FIGURE 10 is a view taken along line 10—10 in FIGURE 8;

FIGURE 11 is a view taken along line 11—11 in FIGURE 8;

FIGURE 12 illustrates typical plunger force vs. plunger travel curves resulting from the action of the switches incorporated in the switch unit of the first embodiment;

FIGURE 13 shows typical forces on the push-collar which may be obtained from the speed responsive arrangement of the exemplification, including the forces on the push-collar resulting from the switch components of the first embodiment;

FIGURE 14 is a schematic circuit diagram showing the application of a second embodiment for my novel switch unit in a multi-speed single-phase, split-phase electric motor, with the motor windings, the improved switch unit including the plunger, push-collar, and switch actuator illustrated in their standstill or starting relative positions;

FIGURE 15 is a front elevational view of the switch unit of the second embodiment schematically revealed in FIGURE 14, with one of the housing members to illustrate switch details and their operative relation;

FIGURE 16 is a fragmentary view in perspective of components incorporated in the switch unit seen in FIGURE 15; and FIGURE 17 illustrates typical plunger-force-plunger travel curves resulting the action of the switches provided in the unit of the second embodiment.

Referring now to the drawings in more detail, and in particular to FIGURES 1–13 inclusive, one form of my improved switch unit is illustrated in connection with the control of a dynamoelectric machine of the single-speed, single-phase, induction type motor 20. In the exemplification shown in FIGURE 1, a pair of end shield or frame assemblies 21, 22 are suitably secured to a stator 23 and support a shaft 24 mounting an induction rotor 26 by suitably lubricated bearings (not shown) for relative rotation with respect to stator 23. The excitation for motor 20, best seen in schematic form in FIGURE 2, is achieved by a single phase main field winding 27 and an auxiliary or starting winding 28 carried in slots provided in the magnetic core of stator 23. These windings are conveniently displaced ninety electrical degrees on the stator core and both are energized during starting conditions. In other words, during the interval required to bring the rotatable assembly (e.g., rotor and shaft) up to a predetermined or the cutout speed of rotation, the windings are excited and cause currents to be induced in the rotor squirrel cage windings, having non-magnetic conductors arranged in rotor slots and short circuited at each end by end rings 25 in the well-known manner.

In the illustrated exemplification of the invention, my improved switch unit 30 is mounted externally on end frame assembly 22 as by positioning projections 31, formed on one of a pair of switch housings 32, 33, which enter complementary holes in the frame and by screws 34. This unit cooperates with a speed responsive mechanism 36, to be described more fully hereinafter, for deenergizing the start winding after the motor reaches the predetermined speed. Housing members 32, 33 are held together in assembled relation by means of their cooperation with individual terminals which project through appropriate slots formed in housing end walls 91, 92. The illustrated manner in which switch housings 32, 33 are held together in assembled relation is more fully disclosed and is claimed in a co-pending patent application of Wladyslaw S. Zagorski, filed November 26, 1965, Serial No. 516,202 which, in turn, is a continuation-in-part of an application filed May 21, 1963, Serial No. 281,994 (now abandoned). The co-pending Zagorski application is assigned to the same assignee as the present invention. As best shown in FIGURE 5, the housing members provide unit 30 with a generally box-shaped and elongated external configuration when assembled together.

Within the housings are mounted a pair of switching devices 40 and 70, having three electrically conductive stationary contact terminals 44, 46, and 71 and electrically conductive movable arms 51, 71 arranged to cooperate with the contact terminals. Each contact terminal is thin and elongated in construction and includes a pair of spaced apart and spade-like co-planar tab sections 93, 94 best shown in FIGURES 9–11. Tab sections 93, 94 extend outwardly from the end 91 of the unit for quick assembly with a pair of complementary quick-connecting female terminals. Each pair of the tab sections is integrally joined to a contact supporting platform 96 which is parallel to but offset slightly from its associated pair of tab sections (FIGS. 6, 7, and 9). The platforms are in spaced apart parallel relationship and in vertical alignment. In regard to stationary contact terminals 44, 46, they have spaced apart fixed contacts 97, 98 secured to the opposed faces of their respective platforms 96 (FIGS. 6, 8, and 9) such that the contacts face each other to form part of a single-pole, double-throw, snap-acting switch device 40. A fixed contact 99, secured to its platform, faces upwardly (as viewed in FIGURES 6 and 8) to form part of the stationary contact terminal 71 for a single-pole, single-throw switch device 70.

At housing end 92 of unit 30, electrically conductive terminal posts 54, 66, and 73 (shown in detail in FIGURES 6 and 8–11), extend through appropriate slots and outwardly in vertical alignment for quick-connection to female terminals (not shown). Each post includes a pair of tab sections 101, 102, identical in configuration to those for the stationary contact terminals, with terminal posts 54 and 73 serving to mount the movable arms for the respective switching devices. Suitable platforms 103, made co-planar and integral with their tab sections are provided for this purpose. Post 66, on the other hand, is a conveniently located dummy terminal and need not be formed with a platform.

Considering now the construction of movable arm 51 for switch device 40, and in particular, FIGURES 6, 8–10 inclusive, arm 51 is fabricated from flexible material, capable of conducting electrical current. Its one end is secured, as by rivets 106, to platform 103 so that it is supported in a cantilever fashion while its free end carries double sided movable contact 52 arranged for selective cooperation with opposed fixed contacts 97, 98. Intermediate its ends, arm 51 is slotted, best shown in FIGURES 10 and 11, so as to provide a central tongue 108 disposed between a pair of elongated leg sections 109, 111.

Snap-action is imparted to contact 52 alternately for rapid selective transfer between fixed contacts 97, 98 by a toggle spring mechanism 112 (FIGURE 9) having a supporting portion 113 attached by the rivets 106 to platform 103 of terminal post 54, which also functions to mount arm 51. A bowed or generally U-shaped curved portion 114 of spring 112 has its free end 115 pivotally connected to tongue 108 by a slot and projection indicated at numeral 116 in FIGURE 10. Curve portion 114 is maintained under compression between portion 113 and movable arm tongue 108 to provide an over-center type snap-action operation, i.e., rapid making and breaking action in either direction of movement for movable contact 52. The cooperative relation between device 70 and an actuating plunger 84 will be described after the illustrated construction of switch device 40, a single-pole, single-throw device, has been reviewed.

Referring now to FIGURES 6, 8, and 9 in particular, the movable arm 72 of device 40 is formed from a generally rectangular piece of flexible material, adapted to carry current, having one end section 121 secured to the platform 103 of terminal post 73 by a riveted connection 122. The free end of the cantilever mounted arm carries a movable contact 123 which overlies and is normally biased by flexible arm 72 toward its associated fixed contact 99 (FIGURES 6 and 8).

For connecting switch devices 40 and 70 in cooperative relation, plunger 84 is arranged to reciprocate between depressed and extended positions revealed in FIGURES 6 and 8 respectively. As seen in FIGURE 7, plunger 84 is molded of cured insulating material and includes an upper section 126 (as viewed in the drawings) adapted to engage the bottom of curved spring portion 114 in switch device 40. Central body section 127 of the plunger is furnished with a tapered channel 128 dimensionally greater at its smallest cross-section than arm 72 of device 70 to receive the arm in actuating lost motion relation. The lower end of the plunger projects through a complementary opening 129 in housing 32 for engagement with axial section 85 of actuator 77.

In order to guide the plunger between extended and depressed positions, a pair of opposed recesses 131 are molded into opposite sides of body section 127 which receive a pair of inwardly facing molded projections 132 (FIGURE 7) formed in body member 32. The projections are adapted to make alternate contact with the end walls 133 and 134 of the recesses 131 to limit and control the total possible reciprocating movement of the plunger 84. However, in the first exemplification of motor 20 as will be appreciated from the discussion hereinafter, an actuator 77 connecting plunger 84 and mechanism 36 together is utilized to determine and control the extended position of the plunger. Thus, in the present exemplification, walls 134 do not contact the associated projections 132 for that purpose. For preventing undesirable lateral movement of plunger 85, that is, movement of the plunger in directions transverse to the axis of its reciprocation, the opposed plunger surfaces 136 are fitted into a recessed channel 137 (FIGURE 6) provided on the inner recessed side of body member 32 and the external rectangular portion of the plunger is retained in its complementary opening 129 of the housing 32 (see FIGURE 7).

Curve "*g*" in FIGURE 12 illustrates the net force displacement characteristics on plunger 84 resulting from unit 30, the curve being based upon one of many units actually constructed in accordance with the illustrated embodiment shown by FIGURES 5–11 inclusive and is typical of the other units. As the plunger moves in the direction of the arrows, the initial force supplied by springs 114 and 72 on the plunger gradually tapers off until the tongue 108 and leg sections 109, 111 of arm 51 are side by side and portion 52 is snapped into engagement with fixed contact 97. During this switching operation, spring 109 is primarily responsible for a rapid or abrupt increase, in the net force being applied on the plunger, indicated by numeral 140 in FIGURE 12. The sharp drop in net force in the plunger in the region of its extended position is caused by the limit placed on the plunger travel.

Broken line curve "*h*" in FIGURE 12 is a plunger-displacement force diagram illustrating the force on plunger 84 with the effect of device 70 removed from unit 30. Curves "*g*" and "*h*" clearly reveal that the principal force exerted on the plunger by devices 40 and 70 is attributable to device 40. In addition, the forces are applied in a direction toward the extended position to retain the plunger normally in that location before unit 30 has been assembled onto motor 20 in the manner revealed in FIGURE 1.

It should be noted at this time that when plunger 84 is in its extended position, as seen in FIGURE 8, spring arm 72 is preferably bowed in the illustrated manner. This resiliently maintains the contacts in the closed position and serves several purposes. It not only insures firm engagement between contacts 99, 123, but additionally slightly reduces the net force being exerted on the plunger as it approaches its extended position thereby affording a cushioning effect on the plunger.

When plunger 84 is transferred from the extended toward the depressed positions (FIGURES 8 and 6 respectively), the enlarged cross section dimension between lips 141 and 142 of channel 128 permits lost motion for the plunger, thereby gaining momentum before lip 141 makes contact with the bottom of spring arm 72. Positive separation of contacts 99, 123 is achieved and the possibility of a welding condition for the contacts is minimized. Continued upward travel of the plunger will oppose the increasing bias of movable spring arm 72. When the over-center point for arm 51 is reached for switching device 40, movable contact portion 52 is thrown with a snap-action into engagement with contact 97 of contact terminal 44. The net forces imparted to the plunger 84 during its return from the extended to the depressed positions is respectively shown in FIGURE 12 as the bottom broken line in curve "*h*" for device 40 and for the combination of devices 40 and 70 by the bottom solid line of curve "*g*."

Returning now to a consideration of FIGURE 2 and the specific application of switch unit 30 for controlling the circuits of windings 27 and 28, it will be observed that only switch device 40 is connected in the winding circuit. In particular, terminal 44 of device 40 is connected through one of its tabs and lead 47 to one external power line 48 going to a suitable power source of alternating current through a main off-on single-pole, single-throw switch (not shown). The other stationary terminal 46 of device 40 is in circuit with start winding 28 through conductor 49. The anchored end of the movable arm 51 is in circuit with main winding 27 by conductor 53 attached to terminal post 54 and line 48 through leads 56, 57 and a standard start switch 58. Windings 27, 28 are connected in parallel to the other side of an external power line 61 through conductor 62 joined to windings 27, 28, a conventional thermal overload protector device 63, conductor 64, and terminal post 66.

Under starting conditions, the switch components are disposed in the relative positions pictured in FIGURE 2, that is, switch 58 being closed and movable contact portion 52 of arm 51 is being in the closed position with respect to stationary contact terminal 46. Consequently, the main winding 27 will be energized across power lines 48, 61, through terminal posts 54, 66 while the start winding 28 is excited in parallel with the main winding between terminal posts 54, 66 via switch arm 51 and stationary contact terminal 46. Actuation of the switch arm 51 into engagement with stationary contact terminal 44 which is connected in circuit with main winding 28 will disrupt and open the start winding circuit.

In the first exemplification, switching device 70 controls an auxiliary circuit which is adapted to be operated during the actuation of the first device. The auxiliary circuit, as shown in FIGURE 2, is open when the motor is energized for starting conditions and may be utilized in the control of electrical components, such as heaters for dishwashers, relays, and the like of the equipment (not shown) in which motor 20 is used. Leads 74, 76 connect device 70 in circuit with the auxiliary component (not illustrated).

The illustrated speed responsive mechanism is constructed in accordance with the disclosure of the James L. Waters patent application Serial No. 306,815, filed September 5, 1963, and assigned to the same assignee as the present invention. Briefly described, the mechanism has a centrifugal weight assembly 37, which is attached to end ring 25 of rotor 26 for rotation with rotor 26 and shaft 24. Assembly 37 is comprised of a push element or collar 38, slidably movable in an axial direction along shaft 24, and a pair of opposing centrifugal weight members 39 supported for pivotal and radial movement on support plate 41 to effect displacement of push-collar 38 when the cutout speed is reached. Two coil or tension springs 42 resiliently bias the opposing weight members 39 and urge the push collar 38 toward the standstill position with a preselected force.

Figure 1:
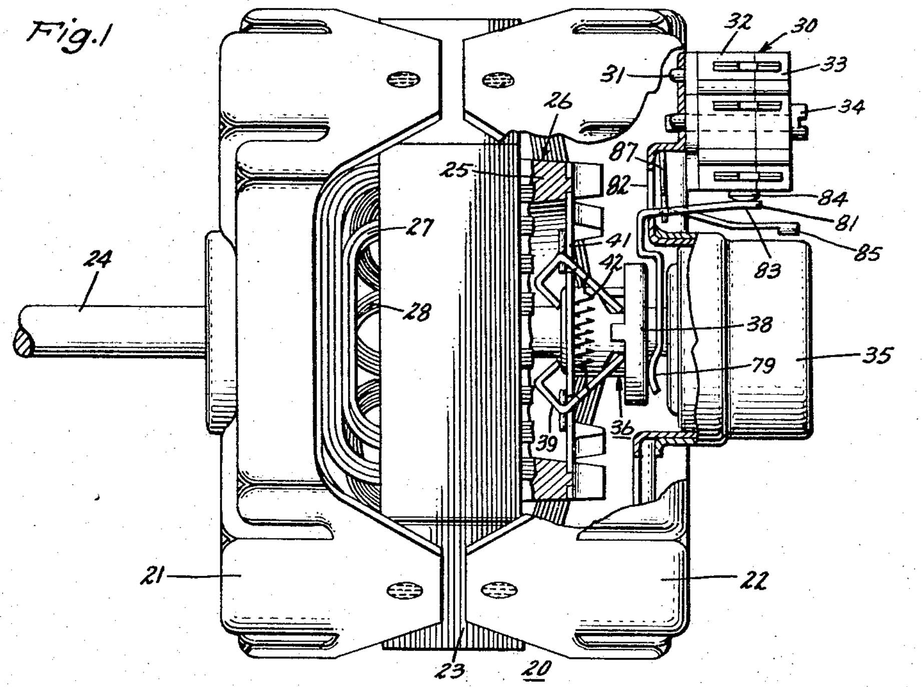
Figures 2, 3, 4:
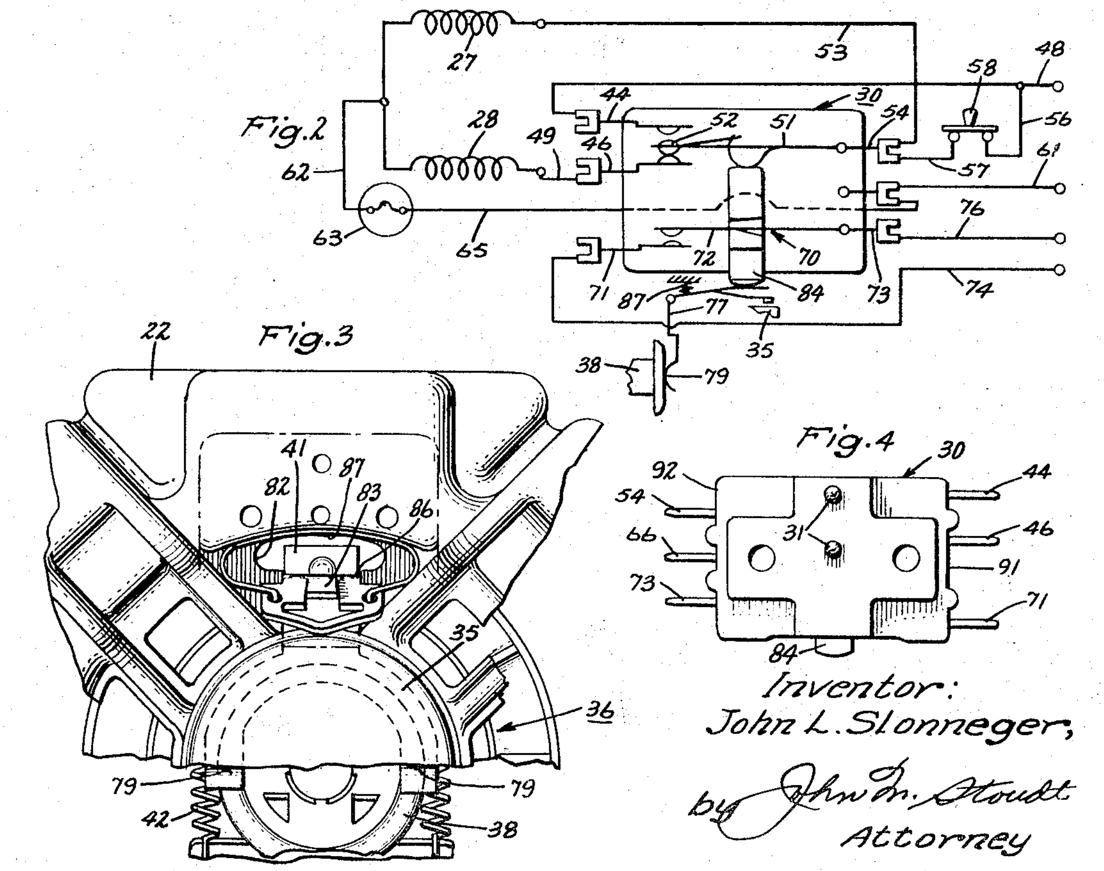
FIGURE 2 is a schematic circuit diagram for the electric motor illustrated in FIGURE 1 depicting the windings, switch unit, the push collar of the centrifugal mechanism and switch actuator components under the same operative conditions shown in FIGURE 1.
FIGURE 3 is an enlarged fragmentary end view showing a part of the switch end for the electric motor of FIGURE 1 with my improved switch unit removed to reveal details of the spring biased switch actuator.
FIGURE 4 is an enlarged rear view of my switch unit of the first embodiment before it has been mounted onto the end frame of the motor pictured in FIGURE 1, the view showing that part of the switch housing adapted to seat against the end frame.

Linkage, best revealed in FIGURES 1 and 3, is utilized to connect collar 38 and plunger 84 of my improved switch unit together for conjoint action. More specifically, a pivoted switch actuator 77 comprised of a radial portion 78 fabricated at one end with a bifurcated section 79, arranged to straddle shaft 24 for engagement with push collar 38. It is integrally joined at the other end to an axial portion 81 extending through an opening 82 in end frame 22. The axial portion has a raised section 83 in contacting relation to a plunger 84 (FIGURE 1) which, in turn, is suitably connected to actuate the two switching devices 40, 70 of unit 30. Opening 82 is fabricated with a recess 86 (FIGURE 3) which serves as a seat or fulcrum for pivotal movement of actuator 77 and a spring 87 retains the axial portion 81 of the actuator on its fulcrum seat.

With the mechanism and switch components in the standstill or start positions, the tension springs 42 of mechanism 36 exert a net force on the push collar 38 in the direction of standstill or extended position while the switch devices of unit 30 and the linkage exert a force against the collar toward the retracted or running position by the pressure engagement of bifurcated section 79 of the linkage on the radial running face of the collar. When the motor windings 27, 28 are concurrently energized, the rotational speed of shaft 24 and rotor 26 increase until the centrifugal forces acting upon the centrifugal weight members counteracts and overcomes the force of the springs 42 to transfer the collar 38 to the equilibrium or cutout position.

It should be noted at this time that in FIGURE 13 curve "*a*" represents the net force produced on the push collar vs. collar displacement resulting from the bias of the centrifugal mechanism (e.g., springs 42) and the rotation of the rotatable assembly. A representative curve depicting the net force applied on collar 38 by the switch unit 30 and its linkage is revealed by curve "*b*." Curve "*d*" in FIGURE 13 shows the typical net resultant force applied to the push collar 38 of the exemplification.

During starting conditions for motor 20 of the exemplification, plunger 84 will be depressed as shown in FIGURE 6, with both devices 40 and 70 applying an initial bias on the plunger in the direction of the arrows. The net force exerted on the push collar by these devices and the linkage will be in a direction opposing springs 42 of mechanism 36 which hold the collar in its standstill position. Bowed portion 114 of device 40 bears downwardly against plunger surface 126 and lower lip 141 of channel 128 holds spring arm 72 of switch device 70 away from fixed contact 99 to provide the bias on the plunger. When the rotational speed of motor 20 is sufficiently high and reaches "cutout," the push collar will travel toward its running position and by virtue of springs 114, 72, and 87, section 79 of actuator will exert the type of force on the running face of collar 38 depicted by curve "*b*" in FIGURE 3.

When collar 38 is being transferred from the running to standstill positions, actuator 77 will be pivoted by collar 38 to initiate reciprocation of plunger 84 from its extended position (FIGURE 8) toward the depressed position (FIGURE 6), overcoming the bias of springs 114, 72, and 87 to actuate switch device 40 and open switch device 70.

Having reference now to FIGURES 14 through 17 inclusive, a second embodiment of my improved switch unit, denoted by numeral 150, is shown in connection with a multi-speed dynamoelectric machine which incorporates the same speed responsive mechanism 36 and mechanical linkage. FIGURES 15 and 16 illustrate the specific details of my improved switch unit 150 of the second embodiment, which differentiates from unit 30 of the first embodiment primarily in the construction and operation of the lower switch device 170 as viewed in the drawings. Consequently, in the second embodiment, like reference numerals designate identical parts previously described.

Flexible arm 171 of device 70 is somewhat shaped, formed by three integral sections 176, 177, and 178 capable of conducting current. Section 176 is mounted by rivets 179 onto the bottom surface of platform 103 of the upper terminal post 54, which also serves as the support for switch arm 51 of device 40, such that section 177 depends downwardly in a vertical direction. The free end of section 178 carries an upwardly facing contact 181 which is normally urged toward downwardly facing contact 99 of the lower stationary contact terminal 71. Intermediate vertical section 177 of arm 71 and contact 181, flexible section 178 fits within channel 128 of plunger 84 for activation thereby.

Assuming the plunger 84 is in its depressed position (solid lines in FIGURE 15), preferably bottom lip 141 forces movable contact 181 into firm engagement with fixed contact 99, putting pressure on flexible section 178 in opposition to the travel of the plunger itself. This interrelationship produces a cushioning effect on plunger 84 as it is being driven into its depressed position and assures a good electrical connection between the closed contacts.

The plunger 84 is returned to its extended position (seen in phantom in FIGURE 15) by the forces exerted upon it by the switch devices of unit 150. After relatively little downward movement of the plunger away from its depressed position, there is lost motion permitted between the arm 171 and the plunger, resulting from the enlarged dimension between tips 141, 142 of channel 128 and upper tip 142 moves into engagement with the top surface of flexible section 178 for opening device 170. Since arm 171 is being moved in opposition to its normally closed position, the force on the plunger resulting from arm 171 gradually increases in a direction opposing movement to the plunger. This interaction produces a cushioning effect on the plunger as it travels into its extended position. The interaction of device 40 and plunger 84 has already been outlined in connection with the first exemplification of our invention.

Curve "j" in FIGURE 17 shows the net force applied to the plunger 84 by unit 150 as the plunger is transferred between the depressed and extended positions, the curve being based on a switch unit actually constructed in accordance with that pictured in FIGURES 15 and 16. Numeral 180 denotes the region of switching operation for the devices. As in the first embodiment, the sharp drop in the net force on the plunger in the region of its extended position is caused by the positive limit being placed on plunger travel; e.g., plunger wall 134. A comparison of curve "j," which is the net force characteristic exerted on the plunger by unit 150, with curve "h" (the effect of device 170 being removed), demonstrates the predominant force characteristics in the net force pattern upon plunger 84 resulting from switch device 40.

Switch unit 150 of the second embodiment is utilized in connection with a two-speed, single-phase induction motor, schematically illustrated in FIGURE 14. The motor has a first main field winding 151 to provide an even number of running poles, such as four, for high speed operation. A second main field winding 152 is wound to provide a greater number of poles than that for winding 152, such as six running poles for low speed operation, and a start winding 153 is furnished with the same number of poles as the first main field winding 151. Stationary contact terminal 44 of switch device 40 is connected by lead 156 to one side of the second main winding 152. Its other stationary contact terminal 46 is in circuit with the one side of main winding 151 by conductor 157 and mounts a lead 158 connecting the terminal to the high speed side 159 of a standard single-pole, double-throw, manually operated speed selector switch 160. The selector arm 165 of the switch is in turn attached to line 173 of a suitable source of alternate power. Terminal post 54, which is in circuit with the movable snap-acting contact arm 51 of device 40, serially connects the arm to the low speed side 161 of the speed selector switch 160 through lead 162.

The second switching device 170 has its movable contact arm 171 connected in series with the low speed side 161 of speed selector switch 160 through terminal post 54 and lead 162. Its single stationary contact terminal 71 is placed in circuit with the start winding 153 by lead 164. The other sides of each of the three windings are commonly joined together at connection 167 and connected to one side of alternating current power lead 168 through leads 169, 172 and terminal post 66 carried by my improved switch unit 150.

The relative positions of certain components for the speed responsive system of the example two-speed motor are illustrated in FIGURE 14 under standstill or starting conditions, with speed selector switch 160 set for low speed operation. Main windings 151 and start winding 153 are initially energized in parallel across lines 173, 168. More specifically, main field winding 151 is excited through the low speed side 161 of switch 160, terminal post 54, snap-acting arm 51, stationary contact terminal post 46, lead 157 and then through terminal post 66 to line 168. The start winding 153 is excited in parallel to winding 151 from terminal post 54, through arm 171 of switch 170 and the stationary contact terminal 71, and finally, to line 168 through terminal post 66.

Once the speed of rotation for rotor 26 and mechanism 36 reaches the "cutout" speed, the push-collar will be transferred in a positive manner toward its running position. As switching occurs, plunger 84 moves toward its extended position (downwardly in FIGURE 14), opening the contacts of switch 170 while movable portion 52 of device 40 is rapidly moved by a snap action into engagement with stationary contact terminal 44. Thus, with switch 170 in the open position, the start winding 153 will be deenergized. In addition, the main winding 151 becomes de-energized in view of the open circuit at stationary contact terminal 46 and the other main winding 152 will be placed in circuit through the engagement of movable arm portion 52 and the upper stationary contact terminal 44 to provide a low speed of operation for the motor, e.g. approximately 1200 r.p.m. for six poles.

For high speed operation, that is, with the selector switch 160 closing high speed side 159 (shown by the broken lines in FIGURE 14), main winding 151 and start winding 153 will once again be energized in parallel during starting when switch devices 40 and 170 assume the relative positions seen in FIGURE 14. A closed path is provided for the main field winding 151 through lead 158, stationary contact terminal 46, lead 157 to connection 167, and then to line 168 through terminal post 66. The circuit of the start winding passes through stationary terminal post 46 and contact portion 52 of snap-acting arm 51, then through the closed contacts of switch 170, lead 164 to connection 167. The other main winding 152, being connected to the open stationary contact terminal 44 will be in open circuit and therefore not energized.

After movable contact portion 52 of switch 40 is op- 44, main field winding 152 will still be deenergized in view of open side 161 of selector switch 160. However, even though switch portion 52 is in engagement with the upper stationary contact terminal 44, main field winding 151 will still be energized through leads 157 and 158 and the intermediate stationary contact terminal 46 to provide a high speed running operation for the motor.

It will be appreciated from the above embodiments that a switch unit built with my invention incorporates rugged components which not only are capable of operating in a relative quiet fashion but in addition are inexpensive to produce and assemble. Furthermore, a switch unit constructed in accordance with my invention has a long operating life potential well over one hundred thousand cycles of operation, and may be employed to control a plurality of electrical circuits, especially winding circuits of electric motors. In addition, the unit by its very nature is flexible in application.

While I have shown and described what is considered to be the preferred two embodiments of my invention in accordance with the patent statutes, it will be obvious to those skilled in the art that changes and modifications may be made in the disclosed structure without departing from my invention. For example, in certain applications, it may be desirable for the forces exerted by the individual switching devices of the unit on the plunger to be so related that they produce a net zero force on the plunger or an equilibrium condition near its extended position to provide a floating or cushioning effect on the plunger in the vicinity of that position. Moreover, my improved switch unit may incorporate more than two switching devices having the desired force characteristics outlined above. It is, therefore, aimed in the appended claims to cover all such changes and modifications as fall within the true spirit and scope of my invention.

What I claim as new and desire to secure by Letters Patent of the United States is:

1. A switch unit comprising a housing formed with switch accommodating means, a plurality of movable contact arms mounted in said accommodating means, a cantilever tongue extending from one of said contact arms, an actuator having a first portion mounted for reciprocal movement in said accommodating means and a second portion exposed from said housing to selectively operate said movable contact arms, a toggle spring mounted in said housing, said toggle spring including a curved section formed at one end of a cantilever arm, said cantilever tongue engaged with the free end portion of the curved section of the toggle spring, said toggle spring providing snap action to said one contact arm, said curved section of said toggle spring engaging the first portion of said actuator and biasing said actuator outwardly away from a depressed position, another of said movable contact arms having a lost motion connection with the first portion of said actuator for imparting direct movement thereto from the actuator first portion during part but not all of the reciprocal movement of said actuator, said another movable contact arm applying a bias to the actuator during at least a part of the movement thereof with the bias applied by the toggle spring being greater than that of said another movable contact arm when the actuator is in the depressed position, thereby to provide a switch unit operable by a single actuator and employing both a rapidly operable snap acting contact arm and another contact arm operable in relatively slow fashion.

2. A switch unit comprising a housing formed with switch accommodating means, first and second switching devices mounted in said means each of which includes an associated relatively high current carrying movable contact arm, a plunger having a portion mounted within said accommodating means for reciprocal movement between depressed and extended positions to act upon the movable contact arms thereby to operate said switching devices, and a toggle spring disposed in biasing engagement with said plunger and continuously biasing said plunger to one of said positions, the movable contact arm of said second switch device applying a bias to said plunger during at least a part of the movement thereof between the two positions, said toggle spring exerting a force on the plunger substantially greater than the force applied on the plunger by the movable contact arm of said second switch device to provide a controlling force on said plunger by said first switching device to provide snap action of the movable contact arm thereof, the movable contact arm of said second switching device having a lost motion connection with said portion of the plunger and being operable by said plunger portion during a part but not all of the reciprocal movement between the depressed and extended positions, whereby said first and second switching devices are both actuated by said plunger and the force required for operating said plunger approximates the force exerted upon said plunger by said toggle spring.

3. A switch unit comprising a housing having interior walls forming switch accommodating means, first and second switching devices disposed in said switch accommodating means, said first switching device being of the single-pole, double-throw type and including an associated cantilever mounted movable contact arm, said second switching device being of the single-pole, single-throw type and including an associated cantilever mounted movable contact arm, a plunger extended into said housing and mounted by said interior walls for reciprocal movement between depressed and extended positions, said plunger including an innermost end and a channel spaced between said innermost end and an outermost end of the plunger, spring means mounted within the housing disposed in continuous engagement with the innermost end of the plunger thereby to exert a controlling force upon said plunger and to enable said plunger to actuate said first switching device, the movable contact arm of the second switching device being extended through the channel of said plunger in a lost motion connection therewith and applying a bias on said plunger less than the bias of said spring means applied to the plunger in the depressed position with said spring means being the controlling force for returning the plunger to the extended position thereby to enable said plunger to actuate said second switching device in non-snapping fashion, whereby said first and second switching devices are both actuated by said plunger and the force required for operating said plunger approximates the controlling force exerted upon said plunger by said spring means.

4. A switch unit comprising a housing having interior walls forming switch accommodating means, first and second switching devices disposed in said switch accommodating means, said switching devices each including an associated movable contact arm, the movable contact arms of the switching devices being of flat elongated construction and disposed in parallel overlying relationship, a plunger including an innermost end and a channel spaced between said innermost end and an outermost end of the plunger, said interior walls having means for mounting said plunger to reciprocate along an axis substantially perpendicular to the movable contact arms between extended and depressed positions, a toggle spring acting upon the movable contact arm of the first switching device, thereby to provide snap action for said first device, said toggle spring being in continuous engagement with the innermost end of the plunger thereby to exert a controlling force upon said plunger and to enable said plunger to actuate said first switching device; the movable contact arm of the second switching device being extended through the channel of said plunger in biasing engagement therewith for a part but not all of the movement of the plunger between said extended and depressed positions, the force exerted on said plunger of the toggle spring being substantially greater than the bias applied by the movable contact arm of said second switching device during the part of the plunger movement thereby to enable said plunger to actuate said second switching device as the plunger is moved toward the extended position primarily by the force exerted thereon from said toggle spring, whereby said first and second switching devices are both actuated by said plunger and the force required for operating said plunger approximates the controlling force exerted upon said plunger by said toggle spring.

5. For use in a dynamoelectric machine having at least two windings, a switch unit for controlling at least one of the windings, comprising a switch housing having a switch accommodating cavity; a first switch device disposed in said cavity, said device including at least one stationary contact and an electrically conductive movable contact arm mounted in operative relation to the stationary contact; a toggle spring connected to said movable contact arm to provide snap action thereof; a second switching device disposed in said cavity having a stationary contact and a flexible, electrically conductive, movable contact arm mounted to provide movement of a free end thereof into and out of engagement with the stationary contact; a plunger having a first portion positioned in said cavity and a second portion extending beyond said switch housing; means in said cavity for guiding the plunger for reciprocal movement between the depressed and extended positions for acting upon the movable contact arms thereby to operate said switch device; said toggle spring disposed in biasing engagement with said plunger and continuously biasing said plunger toward the extended position; said movable flexible contact arm of said second switch device having its free end in engagement with said plunger for a part but not all of the movement of said plunger as the plunger moves between said depressed and extended positions; said free end of said movable flexible contact arm applying a bias on said plunger in a direction away from said extended position when the plunger approaches said extended position for cushioning said plunger as it approaches said extended position.

6. The switch unit of claim 5 wherein the second portion of said plunger is of rectangular cross section, said housing having a rectangular aperture formed in an external wall thereof for receiving and guiding the second portion, and said unit has position limiting means including interengaging recesses and projections formed in the first portion of said plunger and housing.

7. The switch unit in claim 5 in which said flexible contact arm of said second switch device is normally biased toward the extended position of the plunger and engages its associated stationary contact when the plunger is in said extended position; said plunger having means for bowing the free end of said flexible contact arm as the plunger reaches the extended position, whereby the force exerted by the bowed flexible contact arm on the plunger is in opposition to the force applied on the plunger by said toggle spring thereby cushioning the movement of the plunger into said extended position and providing a firm engagement between the closed contacts of said second switch device.

8. The switch unit in claim 5 in which an electrical conductive element supports both of said movable contact arms of the respective switch devices; said movable, flexible contact arm being normally biased toward the depressed position of said plunger and being held away from its associated stationary contact when said plunger is in the extended position thereby cushioning the movement of said plunger as it travels into its extended position.

9. For use in a dynamoelectric machine having at least two windings, a switch unit for controlling at least one of the windings comprising a switch housing having internal walls forming switch accommodating cavity means, a first switch device disposed in said cavity means, said device including at least one stationary contact and an electrically conductive movable contact arm having one end supported by an electrically conductive element and its other end free to move into and out of engagement with the stationary contact; a second switching device disposed in said housing having a stationary contact and a movable flexible, electrically conductive, contact arm, said flexible arm having a first section mounted to said electrically conductive element and a second section in spaced relation to said first switch device for movement into and out of engagement with its associated stationary contact; a plunger slidably mounted by said internal walls for reciprocal movement depressed and extended positions and for acting upon the movable contact arms thereby to operate said switch device; spring means disposed in biasing engagement with said plunger and continuously biasing said plunger toward the extended position; said second section of said flexible contact arm projecting through a transverse channel in said plunger and being in engagement with said plunger for a part but not all of the movement of the plunger as the plunger moves between said depressed and extended positions; said movable flexible, contact arm of said second switch device applying bias on said plunger in a direction away from said extended position when the plunger approaches said position for cushioning said plunger as it moves into said extended position; the force applied on said plunger by said spring means being greater than the bias applied to said plunger by said flexible contact arm when the plunger is in its extended position to maintain the plunger in its extended position.

10. For use in a dynamoelectric machine having at least two windings, a switch unit for controlling at least one of the windings comprising a switch housing having a plurality of internal walls forming switch accommodating cavity means; two of said internal walls being in spaced apart and opposed relation; a first switch device positioned in said cavity means, said device including stationary contact having a terminal portion projecting through one of said two internal walls, an electrically conductive movable contact arm having one end supported by an electrically conductive element provided with a terminal portion projecting through the other of said two internal walls, the other end of said movable contact arm being free to move into and out of engagement with the stationary contacts; a second switching device disposed in said cavity means having a stationary contact provided with terminal means projecting through one of said two internal walls and a movable flexible, electrically conductive, contact arm; said flexible arm having a first section mounted to an electrically conductive element provided with a terminal portion projecting through one of said two internal walls and a second section in spaced relation to said first switch device for movement into and out of engagement with its associated stationary contact; a plunger having a first and second portion with, said first portion mounted within the cavity means for reciprocal movement between depressed and extended positions to act upon the two movable contact arms thereby to operate said switch devices; said second portion projecting beyond the housing; spring means disposed in biasing engagement with said first portion of said plunger continuously biasing said plunger toward the extended position; said second section of said flexible contact arm projecting through a transverse channel in said plunger and having a lost motion connection therewith, with said flexible arm being operable by said plunger as the plunger moves between said depressed and extended positions; and said movable flexible, contact arm of said second switch device applying bias on said plunger with the force exerted on the plunger by said spring means being greater than the bias being applied by said flexible contact arm so that the force of said spring means is the controlling force on said plunger as the plunger moves toward its extended position; whereby the bias applied on the plunger by said flexible contact arm may be in either direction.

11. The switch unit of claim 10 in which the plunger is formed of molded material, having a pair of opposed recesses provided on the outer surface of said first portion thereof; and said interior walls are formed with projections extending into said opposed recesses for limiting the total reciprocal movement of said plunger in at least one of the plunger positions.

12. The switch unit of claim 10 in which said plunger exerts a force on said movable flexible arm when said flexible arm is in engagement with said stationary contact of the second switch device for cushioning the movement of said plunger and for providing a firm engagement between the closed contacts of said second switch device.

References Cited by the Examiner

UNITED STATES PATENTS

| | | | |
|---|---|---|---|
| 2,428,172 | 9/1947 | Miller | 200—67 |
| 3,209,093 | 9/1965 | Simpson | 200—80 |

BERNARD A. GILHEANY, *Primary Examiner.*

H. A. LEWITTER, *Assistant Examiner.*